(12) United States Patent
Andersen et al.

(10) Patent No.: US 12,176,833 B2
(45) Date of Patent: Dec. 24, 2024

(54) METHOD FOR OPERATING ROTATING MACHINERY BY MEANS OF A VARIABLE SPEED DRIVE AND VARIABLE SPEED DRIVE FOR PERFORMING THE METHOD

(71) Applicant: Danfoss Power Electronics A/S, Gråsten (DK)

(72) Inventors: Daniel Andersen, Nordborg (DK); Jörg Dannehl, Soerup (DE); Virgil Ioan Lupu, Nordborg (DK)

(73) Assignee: DANFOSS POWER ELECTRONICS A/S, Gråsten (DK)

( * ) Notice: Subject to any disclaimer, the term of this patent is extended or adjusted under 35 U.S.C. 154(b) by 91 days.

(21) Appl. No.: 18/067,880

(22) Filed: Dec. 19, 2022

(65) Prior Publication Data

US 2023/0198441 A1 Jun. 22, 2023

(30) Foreign Application Priority Data

Dec. 20, 2021 (DE) .......................... 102021133891.3

(51) Int. Cl.
*H02P 23/04* (2006.01)
(52) U.S. Cl.
CPC .................................... *H02P 23/04* (2013.01)
(58) Field of Classification Search
CPC ........ H02P 23/14; H02P 23/04; H02P 25/032; H02P 25/062; H02P 25/064; H02P 25/0805; H02P 27/04; H02P 27/06; H02P 27/085; H02P 2205/07; H02P 1/24; H02P 1/26; H02P 1/30; G01M 13/028; G01M 13/045; G01M 13/04; H02M 1/12; G01H 1/003; G01H 17/00; G01H 3/08
See application file for complete search history.

(56) References Cited

U.S. PATENT DOCUMENTS 9,890,982 B2 * 2/2018 Lifson ................... F25B 49/025
2014/0069195 A1 3/2014 Ledbetter

FOREIGN PATENT DOCUMENTS

| DE | 10 2016 013 404 A1 | 5/2018 |
| DE | 10 2018 211 846 A1 | 1/2020 |
| DE | 10 2020 206 626 B3 | 6/2021 |

* cited by examiner

*Primary Examiner* — Antony M Paul
(74) *Attorney, Agent, or Firm* — McCormick, Paulding & Huber PLLC

(57) ABSTRACT

The present invention is directed at a method for operating rotating machinery, such as an electric motor, by means of a variable speed drive (VSD). The variable speed drive is provided for identifying mechanical resonance points by means of a sensor and corresponding speeds of the machinery; storing the speeds at which the identified mechanical resonance points occur; and bypassing the speeds at which the identified mechanical resonance points occur during operation of the rotating machinery. The invention is also directed at a variable speed drive for performing said method.

20 Claims, 2 Drawing Sheets

METHOD FOR OPERATING ROTATING MACHINERY BY MEANS OF A VARIABLE SPEED DRIVE AND VARIABLE SPEED DRIVE FOR PERFORMING THE METHOD

CROSS-REFERENCE TO RELATED APPLICATION

This application claims foreign priority benefits under 35 U.S.C. § 119 from German Patent Application No. 102021133891.3, filed Dec. 20, 2021, the content of which is hereby incorporated by reference in its entirety.

TECHNICAL FIELD

The present invention is directed at a method for operating rotating machinery, such as an electric motor, by means of a variable speed drive (VSD). The variable speed drive is provided for
identifying mechanical resonance points by means of a sensor and corresponding speeds of the machinery;
storing the speeds at which the identified mechanical resonance points occur; and
bypassing the speeds at which the identified mechanical resonance points occur during operation of the rotating machinery.

The invention is also directed at a variable speed drive for performing said method.

BACKGROUND

Variable speed drives are used for operating rotating machinery such as electric motors. The drives may comprise control devices and programs for controlling the machinery in any required manner.

Rotating machinery has one or more mechanical resonance points. At resonance points, the machinery is excessively excited by e.g. its own motion. The excitation of the machinery may cause large and potentially damaging vibrations. In order to avoid catastrophic damages, machines are usually designed such that their normal operating points do not overlap with any of the inherent resonance points. However, due to the variable speed control and the corresponding breadth of attainable operational speeds of modern machines there is a risk of running into detrimental mechanical resonances.

Such operation at resonance points may lead to several problems such as acoustic noise and accelerated degradation of components of the machinery. Components such as bearings, motors, pipes and other mechanical parts may undergo accelerated wear. Fastening means such as screws may loosen up or even get disconnected and lost. Pipes may crack such that working fluids may leak into the equipment and/or surrounding. Eventually, this may lead to malfunctions and/or the destruction or breakdown of the machinery. In addition, secondary problems may occur in the surroundings of the machinery. Resonances may therefore significantly reduce the lifetime of the machinery and increase the operating costs of the equipment.

In order to overcome these problems and detect mechanical resonances, it is known to use external third-party equipment as well as expert support for vibration analysis of the machinery. It is known to manually configure speed points, which ought to be by-passed during operation in order to avoid operations in resonance points. However, these measures represent expensive solutions, which are usually used only with critical assets or motor applications.

Additionally, resonance frequencies of given machinery are rarely well known prior to its complete assembly or installation and they may change over time. This makes the manual configuration of the bypass function a challenge, if not practically impossible.

SUMMARY

The aim of the present invention is to provide an improved method and drive, which overcome the problems outlined above. This aim is achieved by a method according to claim 1 and a variable speed drive according to claim 9. Preferable embodiments of the invention are subject to the dependent claims.

According to the invention, a method for operating rotating machinery, such as an electric motor, is provided. The method is executed by means of a variable speed drive. The variable speed drive is provided for
identifying mechanical resonance points by means of a sensor and corresponding speeds of the machinery;
storing the speeds at which the identified mechanical resonance points occur; and
bypassing the speeds at which the identified mechanical resonance points occur during operation of the rotating machinery.

The variable speed drive may comprise any hardware and software necessary for operating the machinery under normal operational conditions. Additionally, it may also comprise any hardware and software required for performing the presently described method. In one step, the method detects mechanical resonance points of the machinery and the corresponding speeds of the machine, at which said resonance points occur. Clearly, the invention also comprises the case, in which only a single resonance point and a single corresponding speed of the machinery are identified. However, as the method may be performed repeatedly and as the resonance points may change over time, several different resonance points and corresponding speeds may usually be the case.

The bypassed speeds at which resonances occur may be referred to as bypass speeds throughout the description. According to the invention, it is possible to identify the resonance points of the machinery. Once identified, the drive may control the machinery to bypass said resonance points and the associated bypass speeds of the machinery automatically. This means that during normal operation of the machinery, the drive will inhibit the bypass speeds, even if a user will try to set the machinery to a bypass speed. The method may instead set the machinery to a speed which is close to the bypass speed but which does not lead to the occurrence of resonances.

An already present vibration sensor may be used for the sake of condition-based monitoring (CBM). The sensor may be a component of the drive. The hardware of the drive therefore does not have to be adopted for performing the presently described method. Thus, excessive excitation of the machinery may be easily avoided according to the invention. For example, if some external control signal is input to the drive to operate the machinery at its resonance speed, then the method may override this external signal and/or output some warning signal. Additionally, the machinery may be set to operate at a save speed close to the bypass speed.

The drive may gather data on the mechanical resonance points and the corresponding speeds of the machinery. The drive may thus learn or establish a normal level of vibrations of the machinery. Said normal level of vibrations may be distinguished from the resonance vibrations or resonance points in that e.g. the normal level comprises no peak vibration values.

The stored data may be stored within some memory device of the drive and used as reference for e.g. further calculations.

A major advantage of the present invention is that it avoids operating the machinery at resonance speeds. Hence, the uptime of machinery controlled according to the invention may be increased. Furthermore, the presently described invention may be embedded in the variable speed drive and does not require expensive third-party operators and/or equipment. The same drive or frequency converter is used for automatically detecting and avoiding excitation of mechanical resonances of the machinery, which the drive is controlling. The presently used term "drive" may be understood in a broad sense and may refer to any component or subcomponent for controlling the operation of the machinery.

The method to bypass said resonance frequencies may be a task initiated in scheduled intervals, typically in the start-up phase of the system or when changes influencing the resonance are performed. Such changes may be the replacement of a motor, replacement of bearings in the motor, and/or changes of the load of the motor. The scheduled intervals to repeat a measurement may be repeated on, say, weekly basis, monthly basis or based on the running hours of the system. Alternatively, the resonance frequency detection function may be run continuously on the fly, while the system and motor are performing their normal operations.

The present invention represents a cost-effective solution that makes it possible to monitor critical and less-critical assets alike. It facilitates and increases the accuracy of the commissioning of drives. The lifetime of the machinery and associated assets may be increased while the costs of maintenance and ownership are reduced at the same time. The invention provides a cost-effective solution to mitigate resonance issues of variable speed drive operated machinery.

In a preferred embodiment of the invention, the mechanical resonance points and/or the vibration response of the rotating machinery are identified during a speed and frequency sweep performed by the variable speed drive. In particular, the normal level of vibrations may be established by performing a speed and frequency sweep. The sweep may be performed from a minimum to a maximum speed of the motor, typically in a range from 0 to 120 Hz but not limited to this range.

In another preferred embodiment of the invention, the mechanical resonance points are calculated from baseline values. The resonance points and the associated speeds may be calculated automatically. A user of the invention may visualise the resonance points and/or adjust a bypass range and vibrations tolerances. Up to four or more resonance points may be supported in the nominal speed range of the machinery. The invention makes it possible to operate the motor outside its resonance points only. This means, that machinery speeds generating resonances are skipped and/or not permitted to run for more than short periods of time. In addition, if the resonance frequency changes due to e.g. mechanical changes of the machinery, the correction of the resonance points and the corresponding bypass speeds may also be performed automatically.

In another preferred embodiment of the invention, the bypass range is adjustable. The bypass range may be manually adjustable by a user of the invention.

In another preferred embodiment of the invention, the method is performed automatically, in particular at given time intervals. The execution of the method may be triggered automatically, i.e. without any user interference.

In another preferred embodiment of the invention, the sensor is a sensor of a smart phone, which is in physical, connect with the rotating machinery. The entire smart phone may be rigidly connected to the rotating machinery, the drive and/or other relevant components. An adapter or dedicated machinery portions and/or drive portions may be provided for establishing a connection between the smart phone and said other components. The connection may be sufficiently rigid so as to ensure that the vibration of the machinery is transferred adequately to the smart phone's sensor. The vibration may also be acquired by one or more sensors and transferred to the smartphone. The type of sensors may vary from accelerometer sensors, piezo sensors, the built-in sensor(s) of the smartphone, the built-in microphone of the smartphone and even microphone sensors not built into the smartphone. The type of sensor is not limited to the list but can be any type which is capable of converting vibrations or sounds into electrical signals. The sensors may be placed or positioned in various locations on say, the motor to pick-up the best possible signal. These locations may be on the motor axle, on the load of the motor, on the fan side of the motor, but can also be any locations and positions which are relevant to identifying vibrations.

Additionally or alternatively, a dedicated place of deposit may be provided at the drive and/or at the machinery. The place of deposit may be shaped such that the smart phone may rest therein or thereupon stably during the operation of the machinery, especially when the machinery is operated at resonance points.

In another preferred embodiment of the invention, the smart phone is connected to the variable speed drive for transmitting sensor data to the variable speed drive and/or for controlling the variable speed drive. A wireless connection such as a Bluetooth connection may be provided between the smart phone and the drive.

In another preferred embodiment of the invention, the sensor, in particular an accelerometer is permanently connected to the rotating machinery. The permanently connected sensor makes it possible to continuously update the baseline and add a frequency-band around the resonance.

The invention is also directed at a variable speed drive for performing the presently described method. The drive may comprise any hardware components, which are necessary for performing the presently described method steps.

BRIEF DESCRIPTION OF THE DRAWINGS

Further details and advantages of the invention are described with reference to the figures. The figures show.

DETAILED DESCRIPTION

Figure 1:
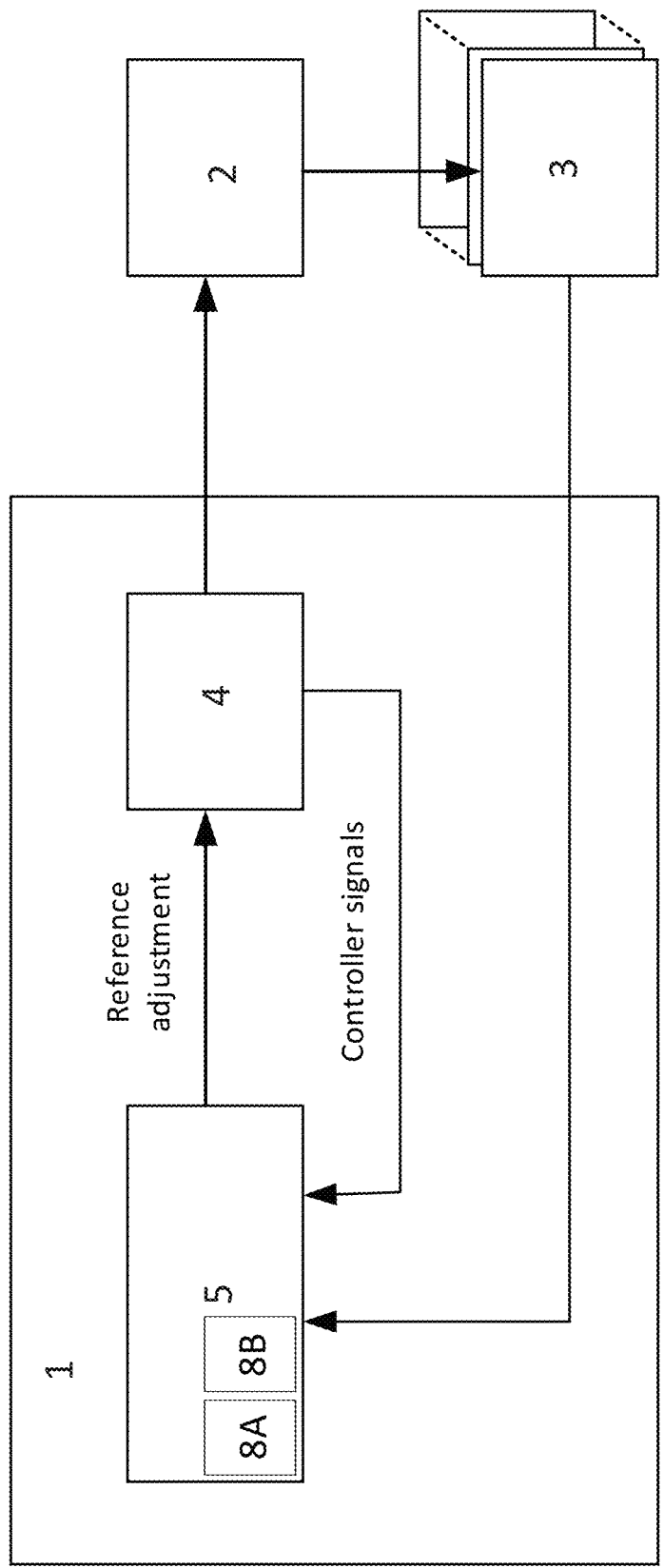
FIG. 1: a flow chart depicting the presently described method.

FIG. 1 shows a flow chart depicting the presently described method. A frequency converter 1, which may be part of a variable speed drive, is connected to some rotating machinery, such as an electric motor 2. The terms variable speed drive and frequency converter 1 are used in a broad sense and may be used interchangeably. They may refer to any device or subcomponent used for controlling rotating machinery. One or more vibrations sensors 3 may be mechanically coupled to the motor 2 and/or the frequency converter 1.

The frequency converter 1 may receive signals from the vibrations sensor 3. Based on the signals received, the frequency converter's 1 computing unit 5 performs a resonance detection computation and controls the motor 2 to bypass speeds at which resonances occur. In particular, a speed controller 4 may be provided such that its reference values are adjusted to omit speeds of the motor 2 at which resonances occur. The signals of the speed controller 4 may be fed back to the computing unit 5 for improving the resonance detection and motor control.

The variable speed drive is provided for performing the following steps:
- identifying mechanical resonance points 8A by means of the sensor 3 and corresponding speeds 8B of the machinery;
- storing the speeds at which the identified mechanical resonance points occur; and
- bypassing the speeds at which the identified mechanical resonance points occur during operation of the rotating machinery.

The sensor 3 may be an integral part of the machinery or the drive. Alternatively or additionally, it may be an external sensor 3 of a separate device such as a smart phone.

The mechanical resonance points and/or the vibration response of the rotating machinery may be identified during a speed and frequency sweep performed by the variable speed drive. In particular, the normal level of vibrations may be established by performing a speed and frequency sweep. The sweep may be performed from a minimum to a maximum speed of the motor 2.

The mechanical resonance points may be calculated from baseline values. The resonance points and the associated speeds may be calculated automatically. A user of the invention may visualise the resonance points and/or adjust a bypass range and vibrations tolerances. The visualisation may be performed using the dive alone or by means of a device connected to the drive, such as a smart phone. Up to four or more resonance points may be supported in the nominal speed range of the machinery.

The invention makes it possible to operate the motor 2 exclusively or nearly exclusively outside its resonance points. In addition, if the resonance frequency changes due to e.g. mechanical changes, the correction of the resonance points and the corresponding bypass speeds may also be performed automatically.

Figure 2:
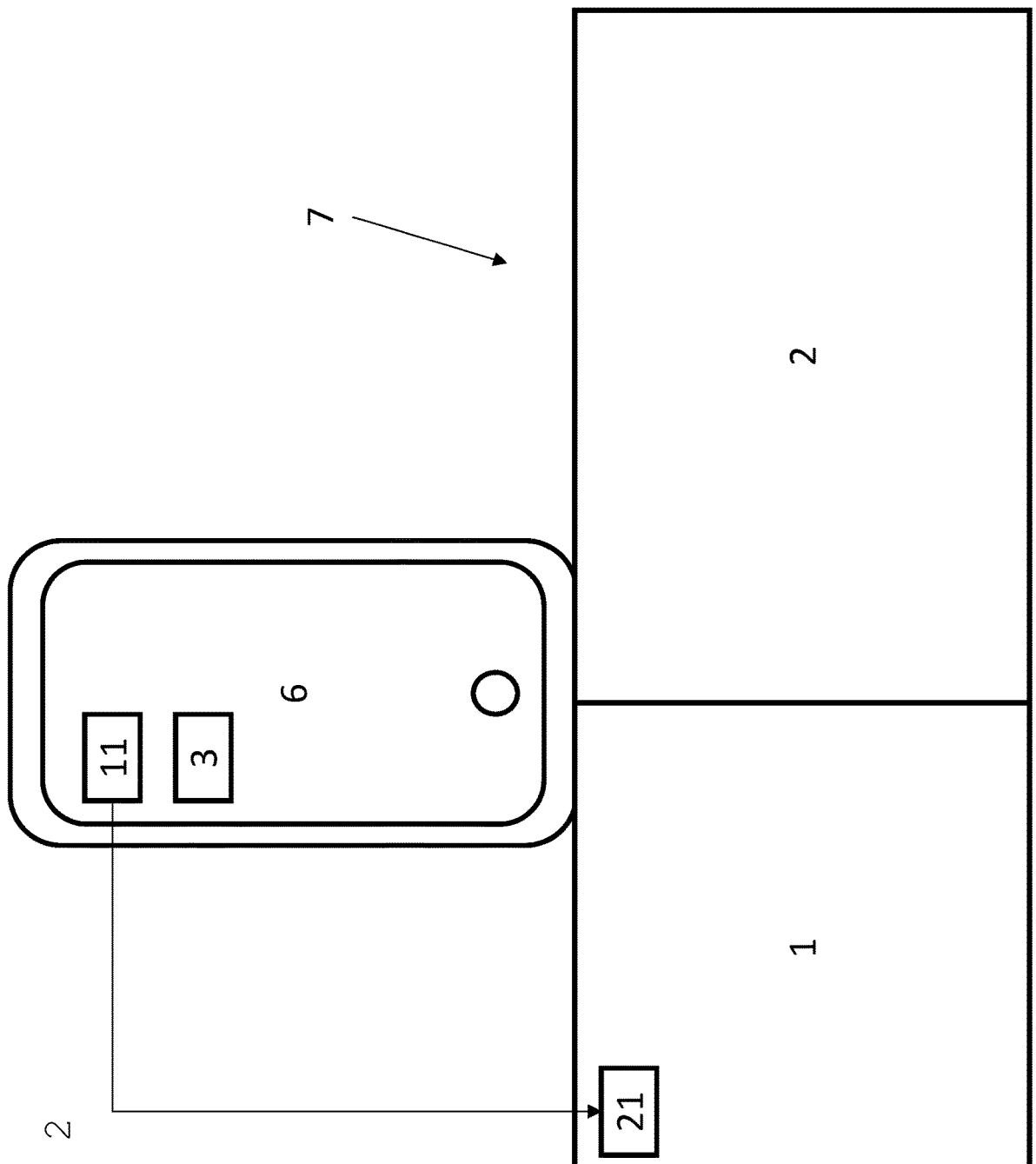
FIG. 2: a schematic representation of the present invention.

FIG. 2 is a schematic representation of one embodiment of the present invention. Here, the sensor 3 is a sensor 3 of a smart phone 6, which is in physical contact to the rotating machinery 7. The term rotating machinery 7 may be understood in a broad sense and may refer to the electric motor 2 and/or additional components such as the drive or frequency converter 1 and/or additional hardware such as gears or fastening structures not shown in the figures.

The entire smart phone 6 may be rigidly connected to the rotating machinery 7, the drive and/or other relevant components. An adapter or dedicated machinery or drive portions may be provided for establishing a riding connection between the smart phone 6 and said other components. The connection may be sufficiently rigid so as to ensure that the vibration of the machinery 7 is transferred adequately to the smart phone 6 or, more precisely, to the sensor 3.

Additionally or alternatively, a dedicated place of deposit may be provided at the drive and/or at the machinery 7. The place of deposit may be shaped such that the smart phone 6 may rest therein safely during the operation of the machinery 7, especially when the machinery 7 is operated at resonance points. The connection between the smart phone 6 and the machinery 7 may be such that vibrations of the machinery 7 may be transmitted adequately to the sensor 3.

The smart phone 6 may be connected to the variable speed drive for transmitting sensor data to the variable speed drive and/or for controlling the variable speed drive. A wireless connection such as a Bluetooth connection may be provided between the smart phone 6 and the drive. The smart phone 6 may comprise some connection hardware 11, which may interact with corresponding connections hardware 21 of the drive.

The sensor 3, in particular an accelerometer, may be permanently connected to the rotating machinery 7. In case a sensor 3 is permanently attached to the rotating machinery 7, said sensor 3 may be connected directly to the drive and/or to a smart phone 6. The permanently connected sensor 3 makes it possible to continuously update the baseline and add a frequency-band around the resonance. In one embodiment of the invention, more than one sensors 3 is used, wherein one sensor 3 may be a sensor 3 of the smart phone 6 and another sensor may be fixedly connected to the machinery 7 or the drive.

The invention is also directed at a variable speed drive for performing the presently described method. The drive may comprise any hardware components, which are necessary for performing the presently described method. In particular, the drive may comprise a dedicated place of deposit and/or some wireless connection means 21 for connecting the drive to a smart phone 6.

While the present disclosure has been illustrated and described with respect to a particular embodiment thereof, it should be appreciated by those of ordinary skill in the art that various modifications to this disclosure may be made without departing from the spirit and scope of the present disclosure.

The invention claimed is:

1. A method for operating rotating machinery, such as an electric motor, by means of a variable speed drive, wherein the variable speed drive is provided for
    - identifying mechanical resonance points by means of a sensor and corresponding speeds of the machinery;
    - storing the speeds at which the identified mechanical resonance points occur; and
    - bypassing the speeds at which the identified mechanical resonance points occur during operation of the rotating machinery.

2. The method according to claim 1, characterized in that wherein the mechanical resonance points and/or the vibration response of the rotating machinery are identified during a speed and frequency sweep performed by the variable speed drive.

3. The method according to claim 2, wherein the mechanical resonance points are calculated from baseline values.

4. The method according to claim 2, wherein the bypass range is adjustable.

5. The method according to claim 2, wherein the method is performed automatically, in particular at given time intervals.

6. The method according to claim 2, wherein the sensor is a sensor of a smart phone which is physically connected to the rotating machinery.

7. The method according to claim 1, wherein the mechanical resonance points are calculated from baseline values.

8. The method according to claim 7, wherein the bypass range is adjustable.

9. The method according to claim 7, wherein the method is performed automatically, in particular at given time intervals.

10. The method according to claim 7, wherein the sensor is a sensor of a smart phone which is physically connected to the rotating machinery.

11. The method according to claim 1, wherein the bypass range is adjustable.

12. The method according to claim 11, wherein the method is performed automatically, in particular at given time intervals.

13. The method according to claim 11, wherein the sensor is a sensor of a smart phone which is physically connected to the rotating machinery.

14. The method according to claim 1, wherein the method is performed automatically, in particular at given time intervals.

15. The method according to claim 14, wherein the sensor is a sensor of a smart phone which is physically connected to the rotating machinery.

16. The method according to claim 1, wherein the sensor is a sensor of a smart phone which is physically connected to the rotating machinery.

17. The method according to claim 16, wherein the smart phone is connected to the variable speed drive for transmitting sensor data to the variable speed drive and/or for controlling the variable speed drive.

18. The method according to claim 1, wherein the sensor, in particular an accelerometer, is permanently connected to the rotating machinery.

19. A variable speed drive for performing the method according to claim 1.

20. The method according to claim 1, wherein the sensor, in particular an accelerometer, is permanently connected to the rotating machinery.

* * * * *

UNITED STATES PATENT AND TRADEMARK OFFICE
CERTIFICATE OF CORRECTION

PATENT NO. : 12,176,833 B2
APPLICATION NO. : 18/067880
DATED : December 24, 2024
INVENTOR(S) : Daniel Andersen et al.

Page 1 of 1

It is certified that error appears in the above-identified patent and that said Letters Patent is hereby corrected as shown below:

In the Claims

Claim 2, at Column 6, Line 49 "The method according to claim 1, characterized in that" should read as --The method according to claim 1,--

Signed and Sealed this
Eighteenth Day of March, 2025

Coke Morgan Stewart
*Acting Director of the United States Patent and Trademark Office*